United States Patent
Nagahama et al.

(10) Patent No.: US 12,498,354 B2
(45) Date of Patent: Dec. 16, 2025

(54) IMMERSION PROBE, FLAW INSPECTION APPARATUS, AND FLAW INSPECTION METHOD

(71) Applicant: HONDA MOTOR CO., LTD., Tokyo (JP)

(72) Inventors: Daisuke Nagahama, Wako (JP); Motoki Okuno, Wako (JP); Yasuyuki Tanimura

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 18/193,103

(22) Filed: Mar. 30, 2023

(65) Prior Publication Data
US 2023/0314380 A1    Oct. 5, 2023

(30) Foreign Application Priority Data

Mar. 31, 2022    (JP) ................................ 2022-059067

(51) Int. Cl.
   *G01N 29/04*      (2006.01)
   *G01N 29/265*    (2006.01)
   *G01N 29/28*     (2006.01)

(52) U.S. Cl.
   CPC ......... *G01N 29/043* (2013.01); *G01N 29/265* (2013.01); *G01N 29/28* (2013.01);
(Continued)

(58) Field of Classification Search
   CPC .... G01N 29/043; G01N 29/265; G01N 29/28; G01N 2291/0234; G01N 2291/044;
(Continued)

(56) References Cited

U.S. PATENT DOCUMENTS 3,687,219 A * 8/1972 Langlois ................ G10K 11/30
                                                          73/644
3,699,805 A * 10/1972 Bayre .................... G10K 11/30
                                                          367/141

(Continued)

FOREIGN PATENT DOCUMENTS

| CN | 102435673 A | 5/2012 |
| JP | 2008-200355 A | 9/2008 |

(Continued)

OTHER PUBLICATIONS

Japanese Office Action dated Jul. 1, 2025 issued in corresponding Japanese application No. 2022-059067; English machine translation included (8 pages).

(Continued)

*Primary Examiner* — Xin Y Zhong
(74) *Attorney, Agent, or Firm* — Rankin, Hill & Clark LLP

(57) ABSTRACT

An immersion probe includes a front plate having a circular shape in a plan view. A surface of the front plate that faces an object to be inspected is formed as a concave surface that is curved so as to be gradually depressed toward the center. Radii of curvature of a first imaginary contact line and a second imaginary contact line orthogonal to each other at the center of the concave surface and extending so as to curve along the concave surface are defined as a first radius of curvature and a second radius of curvature, respectively. The first radius of curvature and the second radius of curvature are different from each other. When an ultrasonic wave is emitted in a solvent, the ultrasonic wave focuses at two points.

11 Claims, 11 Drawing Sheets

(52) U.S. Cl.
CPC ............... *G01N 2291/0234* (2013.01); *G01N 2291/044* (2013.01); *G01N 2291/2634* (2013.01)

(58) Field of Classification Search
CPC ......... G01N 2291/2634; G01N 29/221; G01N 29/225; G01N 29/348
See application file for complete search history.

(56) References Cited

U.S. PATENT DOCUMENTS

| | | | |
|---|---|---|---|
| 5,533,401 A * | 7/1996 | Gilmore | G01N 29/26 73/620 |
| 6,202,489 B1 | 3/2001 | Beffy et al. | |
| 6,237,419 B1 | 5/2001 | Suh et al. | |
| 2008/0200816 A1 | 8/2008 | Fujimura | |
| 2015/0377839 A1* | 12/2015 | Jack | G01N 29/11 702/33 |

FOREIGN PATENT DOCUMENTS

| | | |
|---|---|---|
| JP | 2013-242220 A | 12/2013 |
| JP | 2015-154807 A | 8/2015 |
| JP | 2015-195517 A | 11/2015 |

OTHER PUBLICATIONS

Japanese Office Action Corresponding to JP Application No. 2022-059067, dated Nov. 4, 2025, 6 pages.

\* cited by examiner

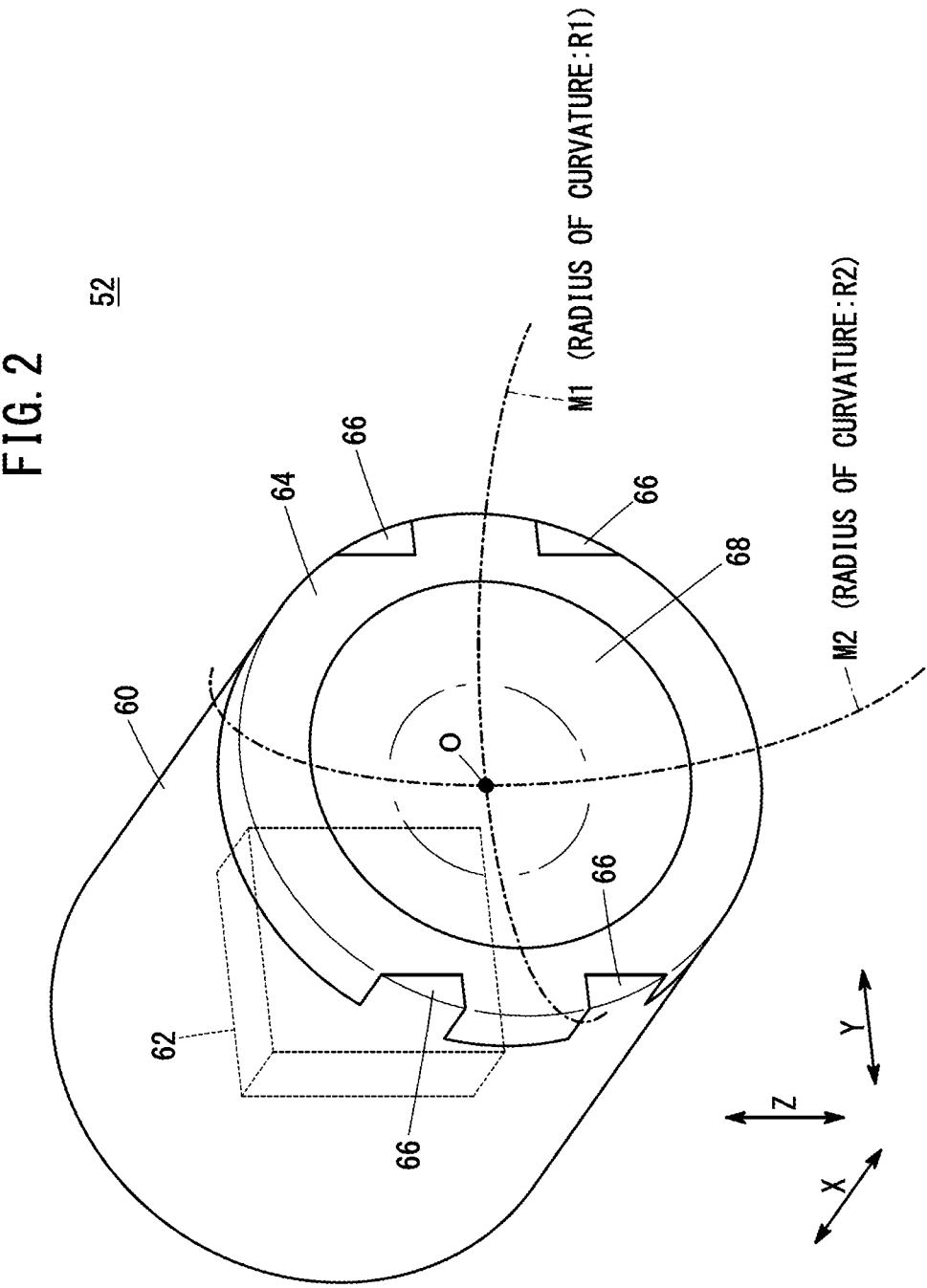

(F1)

(F2)

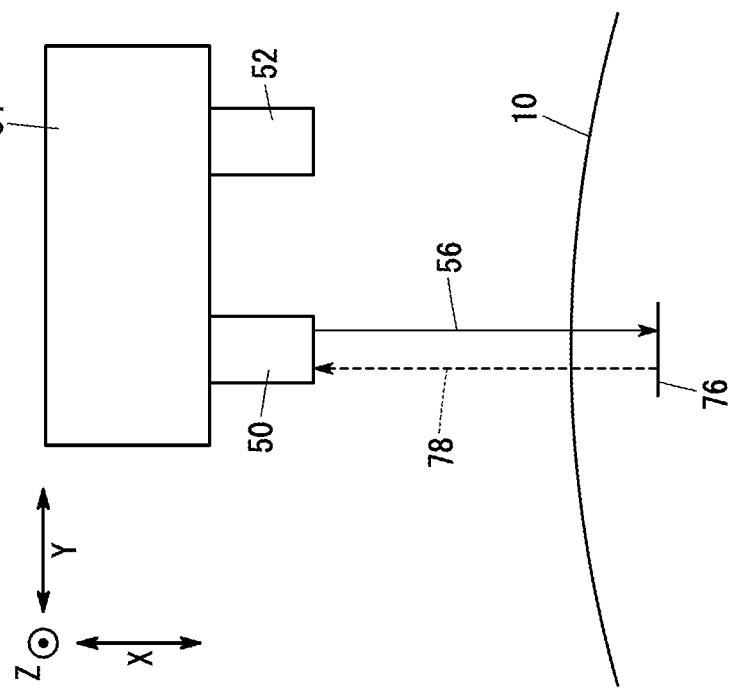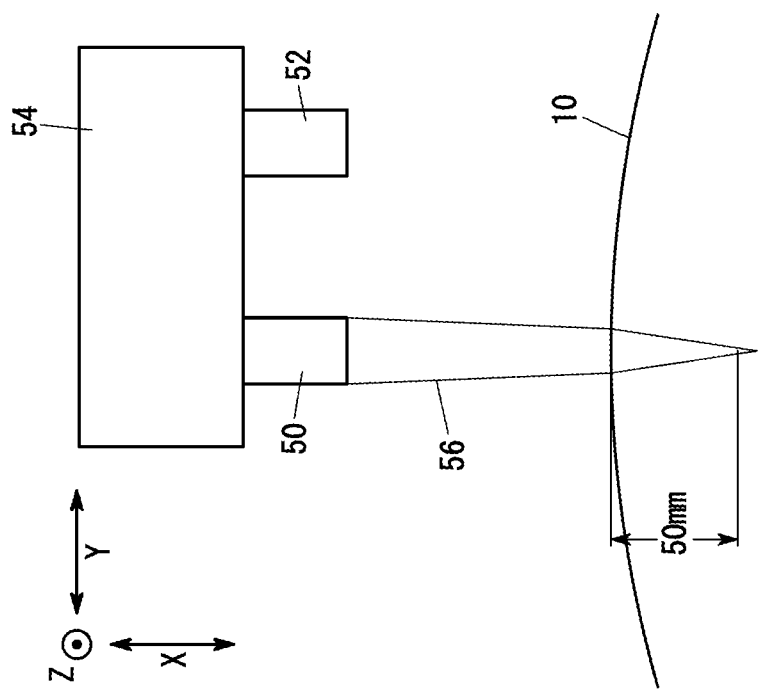

FIG. 9

| ECHO | ⬭ | ⬭ | ⬭ | ○ | ∘ | ⬬ | ⬬ |
|---|---|---|---|---|---|---|---|
| UNDERWATER CONVERTED DISTANCE [mm] | 120 | 165 | 255 | 350 | 440 | 535 |

FIG. 10

| FBH#$_{cal}$ NUMBER | DIAMETER OF FBH | |
|---|---|---|
| | inch | mm |
| #1 | 1/64 | 0.4 |
| #2 | 2/64 | 0.8 |
| #3 | 3/64 | 1.2 |
| #4 | 4/64 | 1.6 |
| #5 | 5/64 | 2.0 |

FIG. 11

| FREQUENCY [MHz] | TRANSDUCER SIZE [mm] | R1 [mm] | R2 [mm] | JUDGEMENT |
|---|---|---|---|---|
| 10~15 | 15 | 220 | 100 | ○ |
| | 15 | 350 | 180 | ○ |
| | 20 | 300 | 140 | ○ |
| | 25 | 500 | 200 | ○ |

IMMERSION PROBE, FLAW INSPECTION APPARATUS, AND FLAW INSPECTION METHOD

CROSS-REFERENCE TO RELATED APPLICATIONS

This application is based upon and claims the benefit of priority from Japanese Patent Application No. 2022-059067 filed on Mar. 31, 2022, the contents of which are incorporated herein by reference.

BACKGROUND OF THE INVENTION

Field of the Invention

The present invention relates to an immersion probe that emits ultrasonic waves, a flaw inspection apparatus including the immersion probe, and a flaw inspection method using the flaw inspection apparatus.

Description of the Related Art

For example, turbine engines have a large number of rapidly rotating members. This type of member is generally produced by subjecting a billet to forging or the like. It is desirable that a member used under a severe environment such as a constituent member of a turbine engine exhibits sufficient durability. In order to obtain such a member, it is conceivable to use a billet in which no large flaws are present. From the above point of view, a flaw inspection is performed on a billet prior to forging or the like. As a specific method thereof, water immersion flaw inspection is exemplified.

In the water immersion flaw inspection, ultrasonic waves are emitted from a probe to a billet immersed in water. When the diameter of the billet is large, there are cases where a plurality of probes that emit ultrasonic waves having different focal points may be used, as described in U.S. Pat. No. 5,533,401 A, in order to detect flaws deep inside the vicinity of the center. This is because an ultrasonic wave having a longer focal length reaches deeper inside the billet.

U.S. Pat. No. 6,202,489 B1 discloses a configuration of a probe which enables oscillating in two modes of an electronic focusing mode and a time reversal mode. In this case, the electronic focusing mode is selected for flaw detection in a relatively shallow portion of the billet, and the time reversal mode is selected for flaw detection in a deep portion. U.S. Pat. No. 6,202,489 B1 discloses that it is possible to detect flaws from the interior to the surface of the billet with a single probe.

SUMMARY OF THE INVENTION

In the technique described in U.S. Pat. No. 5,533,401 A, four immersion probes are used. Accordingly, as the number of probes increases, the number of components of the flaw inspection apparatus increases. Further, it takes a long time to obtain information from all the probes. That is, in this case, it is not easy to reduce the cost. Further, it is not easy to shorten the inspection time.

The construction of the water immersion probe described in U.S. Pat. No. 6,202,489 B1 is complex. Moreover, even with two modes, it is not easy to emit ultrasonic waves over a wide wavelength range. Therefore, it is not easy to perform flaw detection deep inside a billet having a large diameter.

A main object of the present invention is to provide an immersion probe capable of performing flaw detection deep inside an object to be inspected, with a simple configuration.

Another object of the present invention is to provide a flaw inspection apparatus including the above immersion probe.

Still another object of the present invention is to provide a flaw inspection method using the above flaw inspection apparatus.

According to an aspect of the present invention, there is provided an immersion probe including: a transducer configured to emit an ultrasonic wave having a frequency equal to or higher than 10 MHz, to an object to be inspected immersed in a solvent, the immersion probe being configured to inspect presence or absence of a flaw in the object to be inspected, by the ultrasonic wave, the immersion probe further including: a front plate having a circular shape in a plan view and in which a surface facing the object to be inspected is formed as a concave surface which is curved so as to be gradually depressed toward a center of the concave surface, wherein, when radii of curvature of a first imaginary contact line and a second imaginary contact line that extend so as to be curved along the concave surface are defined respectively as a first radius of curvature and a second radius of curvature, the first radius of curvature and the second radius of curvature are different from each other, the first imaginary contact line and the second imaginary contact line being orthogonal to each other at the center of the concave surface, and in the solvent, the ultrasonic wave emitted from the transducer focuses at two points, due to a difference between the first radius of curvature and the second radius of curvature.

According to another aspect of the present invention, there is provided a flaw inspection apparatus including: a storage tank that stores a solvent; and an immersion probe configured to emit an ultrasonic wave to an object to be inspected immersed in the solvent, wherein the immersion probe includes: a transducer configured to emit the ultrasonic wave having a frequency equal to or higher than 10 MHz, to the object to be inspected; and a front plate having a circular shape in a plan view and in which a surface facing the object to be inspected is formed as a concave surface which is curved so as to be gradually depressed toward a center of the concave surface; when radii of curvature of a first imaginary contact line and a second imaginary contact line that extend so as to be curved along the concave surface are defined respectively as a first radius of curvature and a second radius of curvature, the first radius of curvature and the second radius of curvature are different from each other, the first imaginary contact line and the second imaginary contact line being orthogonal to each other at the center of the concave surface; in the solvent, the ultrasonic wave emitted from the transducer focuses at two points, due to a difference between the first radius of curvature and the second radius of curvature; and the ultrasonic wave that has passed through the solvent and entered the object to be inspected focuses at one point inside the object to be inspected.

According to still another aspect of the present invention, there is provided a flaw inspection method for inspecting presence or absence of a flaw in an object to be inspected, by an ultrasonic wave, wherein the ultrasonic wave having a frequency equal to or higher than 10 MHz is emitted from a transducer of an immersion probe, to the object to be inspected immersed in a solvent, the method including: using, as the immersion probe, a probe including a front plate having a circular shape in a plan view and in which a surface facing the object to be inspected is formed as a concave surface which is curved so as to be gradually depressed toward a center of the concave surface, wherein: when radii of curvature of a first imaginary contact line and a second imaginary contact line that extend so as to be curved along the concave surface are defined respectively as a first radius of curvature and a second radius of curvature, the first radius of curvature and the second radius of curvature are different from each other, the first imaginary contact line and the second imaginary contact line being orthogonal to each other at the center of the concave surface, wherein: in the solvent, the ultrasonic wave emitted from the transducer focuses at two points, due to a difference between the first radius of curvature and the second radius of curvature; and the first radius of curvature and the second radius of curvature are set in a manner so that the ultrasonic wave that has passed through the solvent and entered the object to be inspected focuses at one point inside the object to be inspected.

According to the present invention, a double-focus probe having two focusing points (focal points) of ultrasonic waves is adopted as the immersion probe, and the focal distance of a short-focus wave is extended by the lens effect of the object to be inspected. As a result, the two focal points substantially coincide with each other inside the object to be inspected. Therefore, it is easy to determine whether or not a flaw is present over range deep inside the object to be inspected (perform flaw inspection).

Therefore, it is possible to detect a flaw which cannot be detected since the flaw has a size equal to or smaller than the detection limit in the conventional technique. Therefore, for example, an object to be inspected for which a flaw is not detected even in the present invention can be selected as a material for obtaining a member that can be used under a severe environment. Such a material exhibits sufficient durability.

The double-focus probe can be obtained by forming a concave surface on the front plate. With this configuration, it is possible to configure an immersion probe capable of performing flaw detection deeply inside an object to be inspected, with a simple configuration.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a schematic perspective view of an immersion probe of the flaw inspection apparatus of FIG. 1;

FIG. 8A shows a state in which an immersion probe different from the immersion probe of FIG. 2 faces a billet;

FIG. 8B is a schematic explanatory view showing a state in which a reflected wave is generated by a flaw;

FIG. 9 is a change diagram showing a relationship between a distance from a second probe (underwater converted distance, that is, converted distance in water) and the profile data of the ultrasonic beam focused inside the billet when the ultrasonic wave enters the billet;

FIG. 10 is a table showing a relationship between a reference FBH (Flat Bottom Hole or circular flat flaw) and the diameter of a FBH whose presence or absence can be determined; and FIG. 11 is a table showing evaluation of characteristics as a double-focus probe with respect to immersion probes having various different first and second radii of curvature.

DETAILED DESCRIPTION OF THE INVENTION

Figure 1:
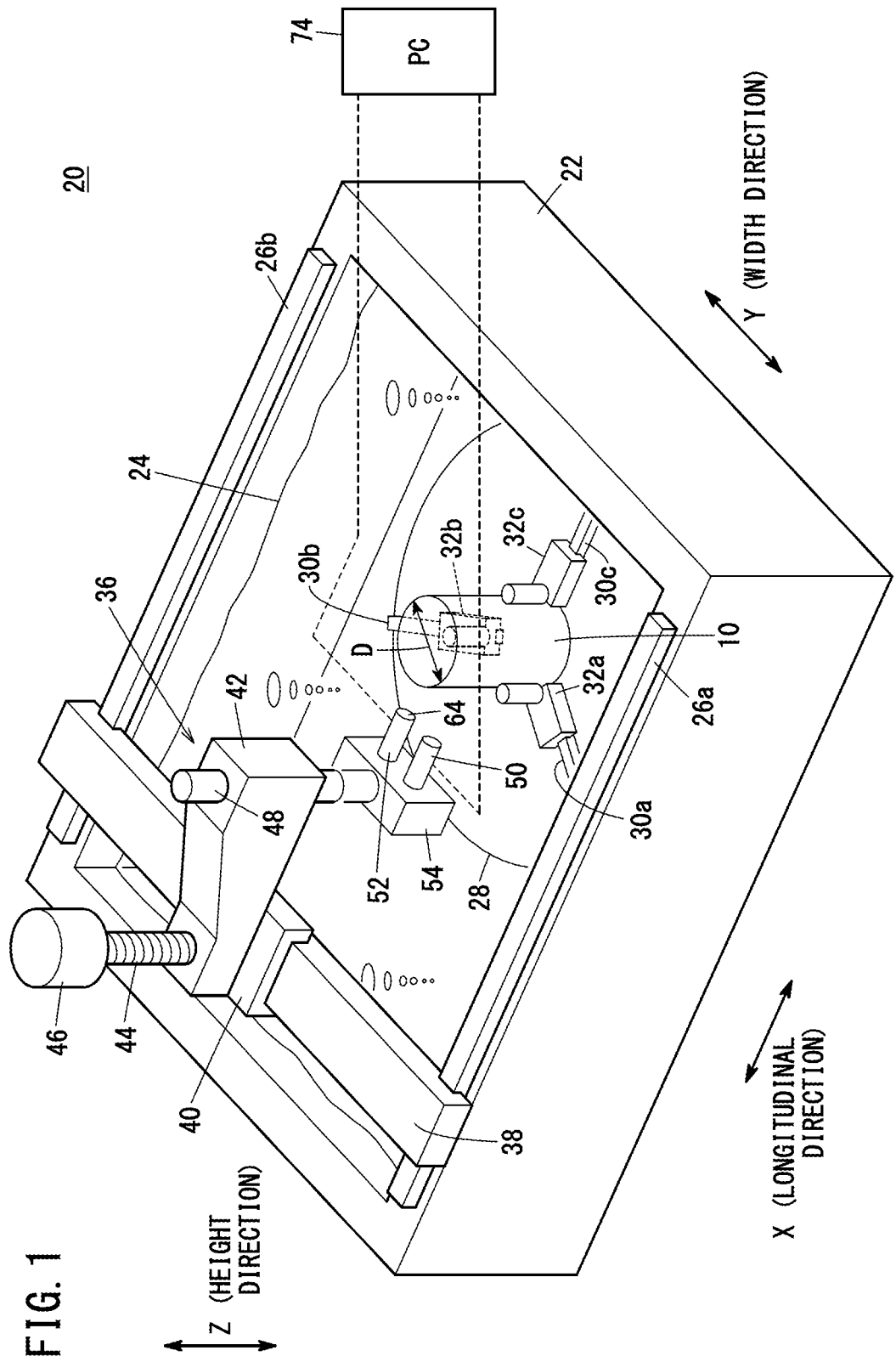
FIG. 1 is a schematic perspective view of a flaw inspection apparatus according to an embodiment of the present invention.

Hereinafter, a flaw inspection method according to the present invention will be described in detail with reference to the accompanying drawings by citing preferred embodiments in relation to an immersion probe for performing the flaw inspection method and a flaw inspection apparatus configured to include the immersion probe. In the following description, "front" refers to a direction toward an object to be inspected, and "rear" refers to the opposite direction. For example, the expression "front end of the immersion probe" means "an end portion of the immersion probe that faces toward the object to be inspected".

First, a billet 10 shown in FIG. 1 will be described. The billet 10, which is an object to be inspected, is cylindrical and have the diameter D of 8 inches (203.2 mm) in this case. The billet 10 is produced by so-called powder metallurgy in which powder of a heat-resistant nickel-based alloy is sintered. That is, the billet 10 is made of a heat-resistant nickel-based alloy.

On the other hand, the flaw inspection apparatus 20 includes a storage tank 22. Water 24 as a solvent is stored in the storage tank 22. As will be described later, ultrasonic waves propagate through the water 24 and reach the billet 10. Displacement guide rails 26a and 26b are laid on the upper surface of the storage tank 22.

A rotary table 28 for positioning and fixing the billet 10 is installed at the bottom of the storage tank 22. The rotary table 28 can be rotated by driving of a rotation motor or the like (not shown) provided on a lower surface side of the rotary table 28. Clamping guide rails 30a, 30b, 30c are laid on the upper surface of the rotary table 28. The clamping guide rails 30a to 30c extend radially from the rotation center of the rotary table 28 and are circumferentially spaced apart from each other at an angle of substantially 120°. Clamping claws 32a, 32b, 32c are slidably provided on the clamping guide rails 30a to 30c, respectively. The clamping claws 32a to 32c synchronously move along the clamping guide rails 30a to 30c under the action of linear actuators (not shown).

In the clamping claws 32a to 32c, end portions facing the billet 10 are formed as protrusions protruding vertically upward. As the clamping claws 32a to 32c approach each other, the billet 10 is clamped by the protrusions. By this clamping, the billet 10 is positioned and fixed at the center of the rotary table 28 in an upright posture. The billet 10 rotates following rotation of the rotary table 28.

The flaw inspection apparatus 20 further includes a movable unit 36 attached to the storage tank 22. The movable unit 36 includes an X-axis moving stage 38, a Y-axis moving slider 40, and a Z-axis moving holder 42. The X-axis moving stage 38 is arranged on the displacement guide rails 26a and 26b, and is displaced in the X direction along the displacement guide rails 26a and 26b by a linear actuator (not shown). The X direction is the longitudinal direction of the storage tank 22.

The Y-axis moving slider 40 is engaged with the X-axis moving stage 38 and is displaced along the X-axis moving stage 38 (in the Y direction) by a linear actuator (not shown). That is, the X-axis moving stage 38 guides the Y-axis moving slider 40 during this displacement. The Y direction is the width direction of the storage tank 22.

The Y-axis moving slider 40 is provided with a ball screw 44 serving as a vertical displacement actuator. The Z-axis moving holder 42 is displaced in the Z direction (height direction) along the ball screw 44 as the ball screw 44 is rotated by a screw rotation motor 46. An X direction, a Y direction, and a Z direction in the following drawings correspond to the X direction, the Y direction, and the Z direction in FIG. 1.

The lower surface of the Z-axis moving holder 42 is formed as a horizontal surface. The upper surface thereof is formed as an inclined surface that is inclined so as to be more upward as the distance from the ball screw 44 increases. Therefore, the Z-axis moving holder 42 has a trapezoidal shape in which one end through which the ball screw 44 is passed is short and the other end away from the ball screw 44 is long. A holding shaft 48 is passed through the other end separated from the ball screw 44. Further, a probe holder 54 holding a first probe 50 and a second probe 52 is provided at the lower end of the holding shaft 48. That is, the first probe 50 and the second probe 52 (which are both immersion probes) are held by the Z-axis moving holder 42 via the holding shaft 48 and the probe holder 54.

The first probe 50 is a probe for performing a flaw detection on a region from the surface to the depth of 50 mm, of the billet 10, and is a point focusing probe. The minimum size of a detectable flaw becomes smaller as the frequency of the ultrasonic wave increases. For this reason, as the first probe 50, a probe having a transducer capable of emitting ultrasonic waves 56 (see FIG. 8A) at a frequency equal to or higher than 10 MHz is selected. The frequency of the ultrasonic waves 56 emitted by the transducer of the first probe 50 is, for example, 15 MHz, but may be 10 MHz. In the latter case, the near-field length is increased.

As the first probe 50, a probe is selected such that the maximum amplitude of noise is less than 10% in a preliminary test profile in which the maximum amplitude of the reflected wave from a circular flat flaw (Flat Bottom Hole: hereinafter also referred to as "FBH") having a diameter of 0.4 mm in an internal flaw type reference test piece is set to 80% of the vertical scale. That is, the first probe 50 has a good signal-to-noise ratio (S/N ratio). Therefore, based on the actual inspection profile by the first probe 50, it is possible to easily determine whether or not a fine flaw is present in a region of the billet 10 from the surface to the depth of 50 mm.

Next, the second probe 52 as the immersion probe according to the present embodiment will be described. FIG. 2 is a schematic perspective view of the second probe 52. The second probe 52 includes a cylindrical casing 60, a transducer 62 housed in the casing 60, and a front plate 64 that closes a front end opening of the casing 60. An electrode, a damper, and the like are also housed in the casing 60, but they are not particularly shown.

The transducer 62 is composed of a piezoelectric body, and emits ultrasonic waves by oscillating as a result of repetition of ON and OFF of application of a voltage thereto from the electrode. In this case, the transducer 62 is capable of oscillating ultrasonic waves having a frequency equal to or higher than 10 MHz (typically, 10 MHz). The transducer 62 is also capable of receiving ultrasonic waves reflected at a location where a flaw exists in the billet 10 and returned to the transducer 62. The ultrasonic wave returning to the transducer 62 is a reflected wave.

Four tab-shaped stoppers 66 protrude from the front end of the casing 60. These tab-shaped stoppers 66 are folded back toward the front plate 64. Due to this, the front plate 64 is prevented from coming off the casing 60.

The front plate 64 attached to the front end of the casing 60 has a circular shape in plan view. In the front plate 64, the front surface facing the object to be inspected is formed as a concave surface 68 gradually depressed toward the rear side (i.e., in a direction away from the object to be inspected) as it goes toward the center O. In other words, the entire concave surface 68 is a curved surface.

Figure 3B:
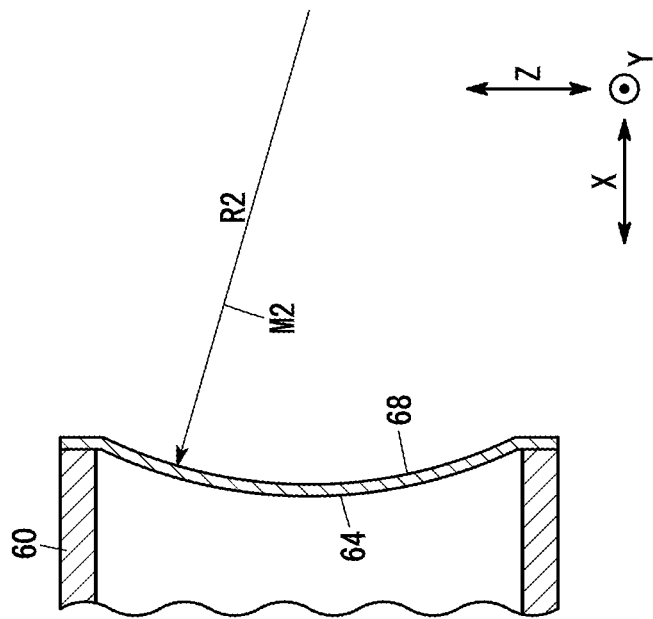
FIG. 3B is a cross-sectional view of the main part along a Z direction.
Figure 3A:
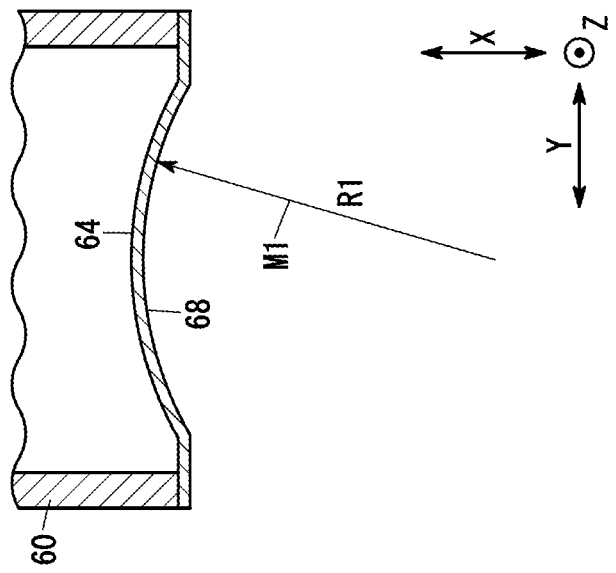
FIG. 3A is a cross-sectional view along a Y direction, of a main part of the immersion probe of FIG. 2.

Here, the radius of curvature of the concave surface 68 in the Y direction and the radius of curvature thereof in the Z direction are different from each other. To be more specific, an imaginary contact line passing through the center O and extending while contacting the curved surface of the concave surface 68 in the Y direction is defined as a first imaginary contact line M1. An imaginary contact line that extends while contacting the curved surface in the Z direction and that is orthogonal to the first imaginary contact line M1 is defined as a second imaginary contact line M2. The radius of curvature of the first imaginary contact line M1 is defined as a first radius of curvature R1, and the radius of curvature of the second imaginary contact line M2 is defined as a second radius of curvature R2. In the present embodiment, R2>R1. That is, as shown in FIG. 3A, the curvature is large in the Y direction, and thus the degree of curving in the Y direction is large. On the other hand, as shown in FIG. 3B, the curvature is small in the Z direction, and thus the degree of curving in the Z direction is small.

Figure 4:
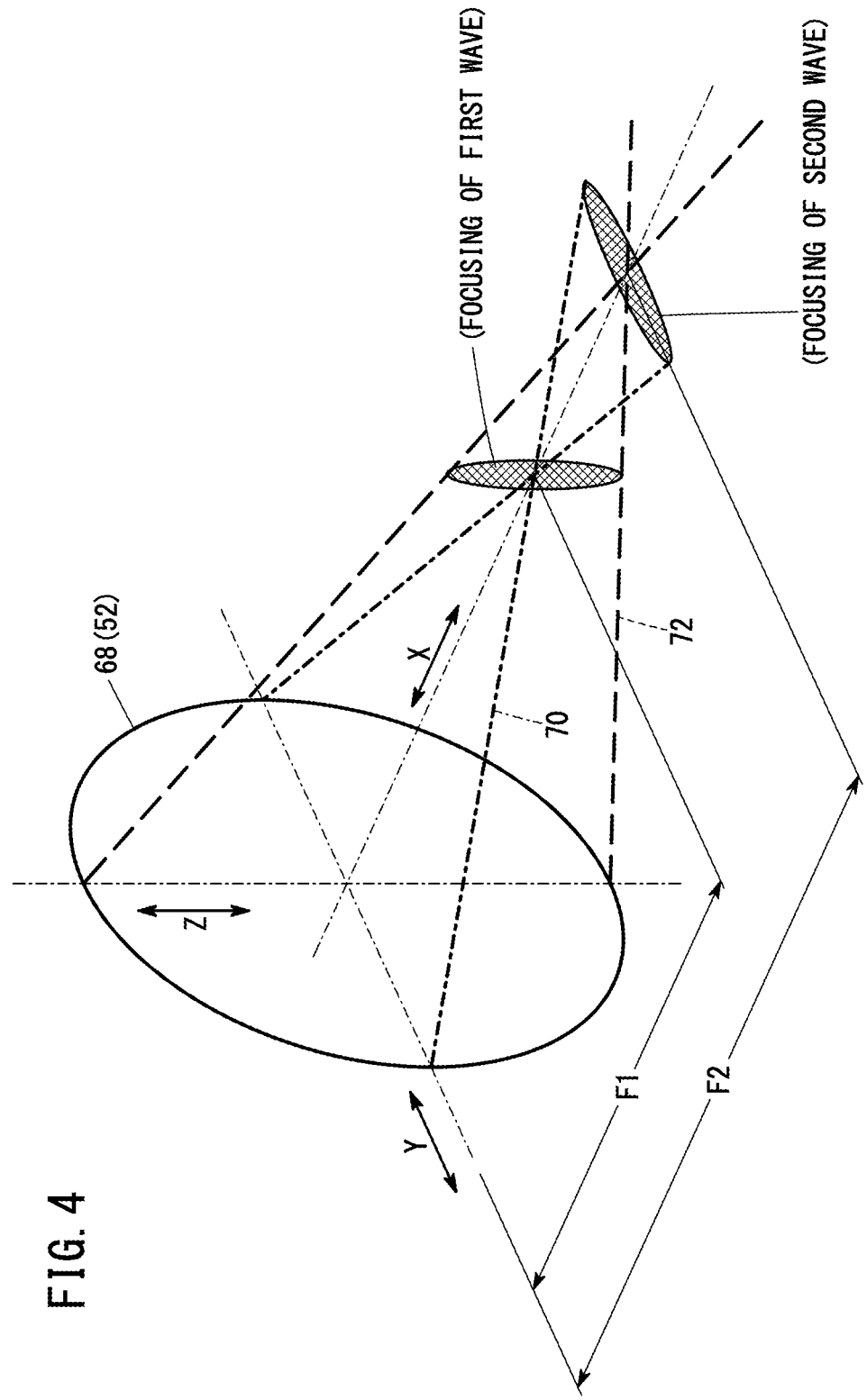
FIG. 4 is a schematic explanatory view showing a focal point of an ultrasonic wave emitted from the immersion probe of FIG. 2.

Therefore, when the billet 10 is not present in the water 24, as shown in FIG. 4, the focal distance of the ultrasonic waves spreading along the Y direction is F1, and the focal distance of the ultrasonic waves spreading along the Z direction is F2 which is longer than F1. In order to simplify the description, the ultrasonic waves spreading along the Y direction is hereinafter referred to as a "first wave 70", for convenience. The ultrasonic waves spreading along the Z direction is referred to as a "second wave 72".

As noted above, the focal distance of the first wave 70 is F1 and the focal distance of the second wave 72 is F2. In other words, the focal point of the first wave 70 and the focal point of the second wave 72 are different from each other. As described above, the ultrasonic waves in the second probe 52 are focused at two points (i.e., two focal points), based on the difference between the radius of curvature of the concave surface 68 in the Y direction and the radius of curvature of the concave surface 68 in the Z direction. As can be understood from this, the second probe 52 is a bifocal (double-focus) probe.

Figure 5A:
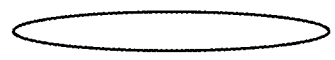
FIG. 5A is an ultrasonic beam profile data showing a focused area of ultrasonic waves at F1 and F2 with respect to a flat incident target in FIG. 4.
Figure 5B:
FIG. 5B is an ultrasonic beam profile data showing a focused area of ultrasonic waves at F1 and F2 with respect to a flat incident target in FIG. 4.

FIGS. 5A and 5B show ultrasonic beam profile data obtained when a flat reference test piece having a flat plate shape is placed at the F1 and the F2, respectively. Since the second wave 72 is not yet focused at the F1, an echo extending in the Z-direction is observed corresponding to the spreading of the second wave 72 at the F1. On the other hand, although the second wave 72 is focused at the F2, the first wave 70 once focused at the F1 spreads at the F2. Therefore, an echo extending in the Y direction is observed corresponding to the spreading of the first wave 70 at the F2.

Figure 6:
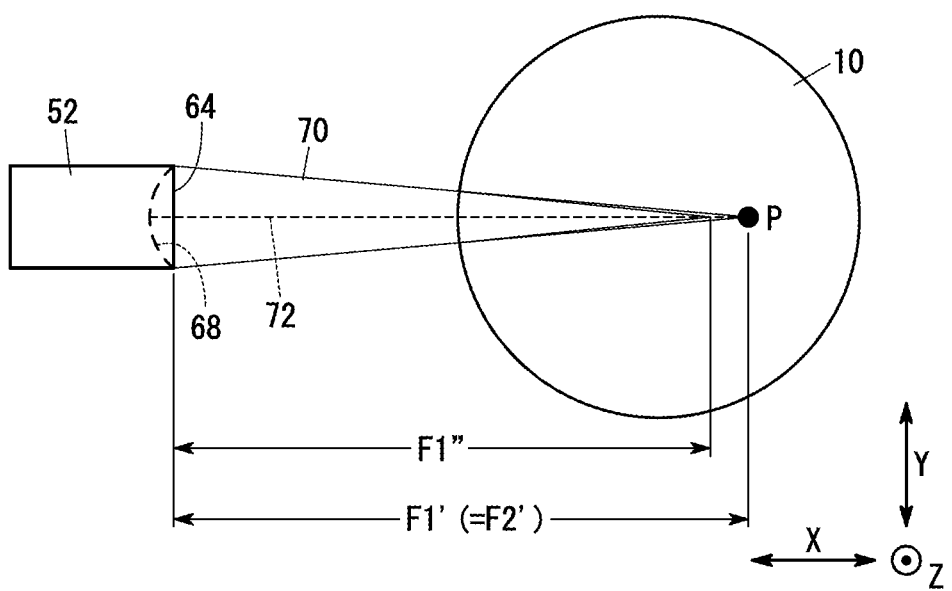
FIG. 6 is a schematic illustration showing how the focal length is extended when a first wave enters a billet.
Figure 7A:
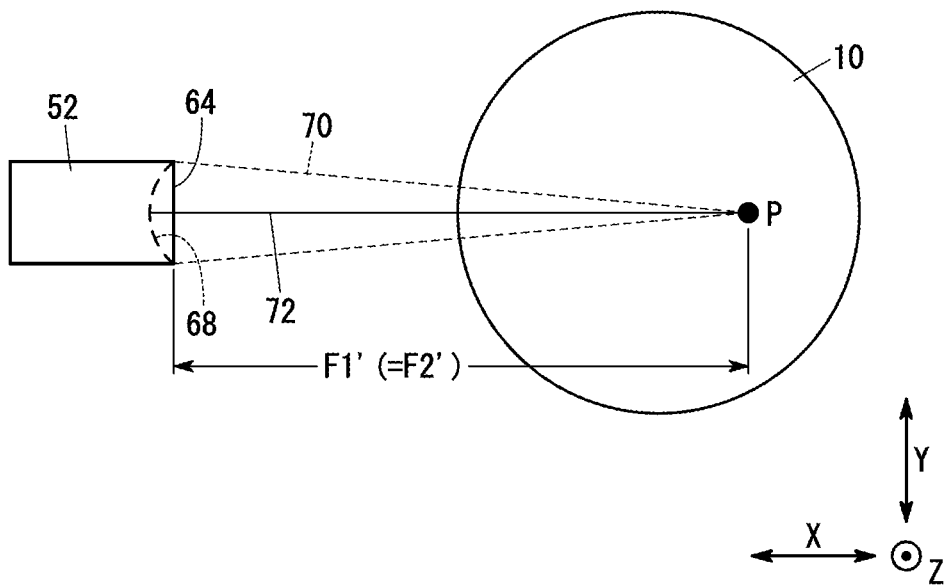
FIG. 7A is a schematic explanatory view showing a situation in which a second wave enters a billet.
Figure 7B:
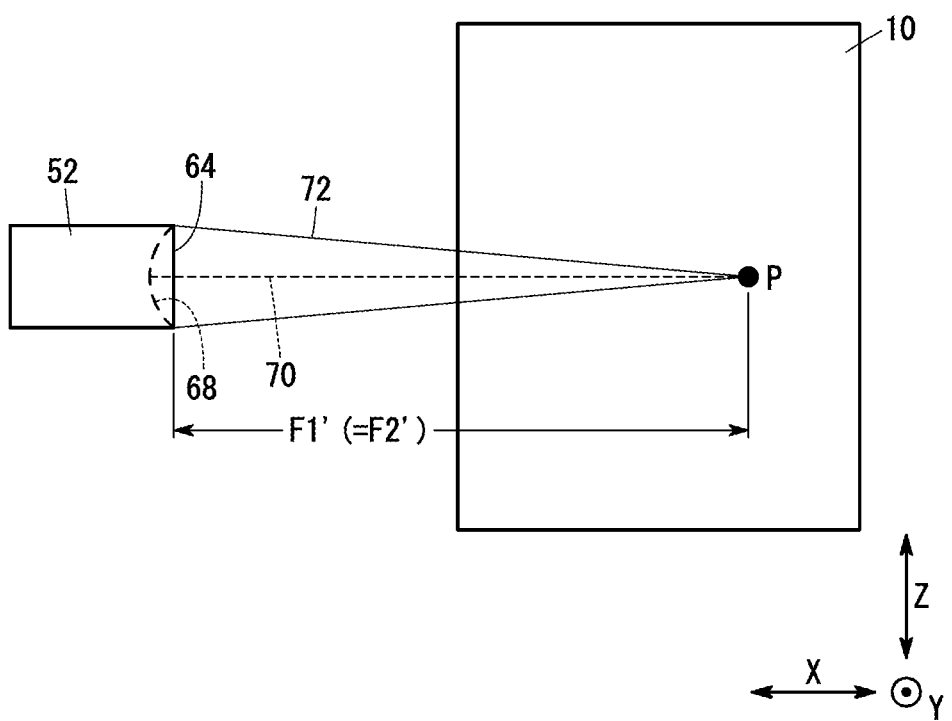
FIG. 7B is a schematic explanatory view showing a situation in which a second wave enters a billet.

On the other hand, when the first wave 70 enters the billet 10 in the water 24, the focal distance of the first wave 70 is F1' as shown in FIG. 6. F1' is greater than the focal distance F1 in the flat reference test piece. On the other hand, when the second wave 72 enters the billet 10 as shown in FIGS. 7A and 7B, the focal distance F2' is substantially equal to the focal distance F2 in the flat reference test piece. That is, no change in the focal distance of the second wave 72 is observed. As can be understood from comparison between FIGS. 6, 7A, and 7B, the focal point of the first wave 70 and the focal point of the second wave 72 substantially coincide at a point P. This point will be described later.

The first radius of curvature R1 and the second radius of curvature R2 are set such that the focal point of the first wave 70 and the focal point of the second wave 72 (point P) are beyond the center of the diameter of the billet 10, based on the diameter (or the radius of curvature) of the billet 10, the wave velocity ratio between the water 24, which is a solvent, and the heat-resistant nickel-based alloy, which is the material of the billet 10, the minimum beam width, or the like. An example of the first radius of curvature R1 is in a range of 150 to 200 mm, and an example of the second radius of curvature R2 is in a range of 450 to 500 mm.

The second probe 52 configured as described above performs flaw inspection on the billet 10 over a range from the depth of about 35 to 40 mm to beyond the diametric center (whose depth from the surface is 4 inches=101.6 mm). That is, part of the flaw detection range by the first probe 50 and part of the flaw detection range by the second probe 52 overlap each other.

In the second probe 52, similarly to the first probe 50, the maximum amplitude of noise is less than 10%, in the preliminary test profile in which the maximum amplitude of the reflected wave from FBH having a diameter of 0.4 mm in the internal flaw type reference test piece is set to 80% of the vertical scale. That is, the second probe 52 also has a good S/N ratio. Therefore, based on the actual inspection profile by the second probe 52, it is possible to easily determine whether or not a fine flaw is present in the billet 10 over a range from the depth of 50 mm to the depth beyond the diametric center.

The flaw inspection apparatus 20 further includes a computer 74. The ultrasonic beam profile data, the actual inspection profile, or the like is displayed on the display of the computer 74.

The second probe 52 (immersion probe) and the flaw inspection apparatus 20 according to the present embodiment are basically configured as described above. Next, operations and effects of the second probe 52 (immersion probe) and the flaw inspection apparatus 20 will be described in relation to the flaw inspection method according to the present embodiment.

When the flaw inspection is performed on the billet 10, first, the billet 10 is positioned and fixed to the rotary table 28 (see FIG. 1). That is, the billet 10 is placed in an upright posture at the center of the rotary table 28. Next, the linear actuators are driven to displace the clamping claws 32a to 32c toward the center of the rotary table 28. At this time, the clamping claws 32a to 32c are guided by the clamping guide rails 30a to 30c. The protrusions of the clamping claws 32a to 32c clamp the lower end portion of the billet 10 from three directions. Thus, the billet 10 is positioned and fixed at the center of the rotary table 28. When the billet 10 (test piece) can be self-supported, it is not particularly necessary to use the clamping claws 32a to 32c.

Next, the linear actuators are driven to displace the X-axis moving stage 38 along the displacement guide rails 26a and 26b. That is, the first probe 50 and the second probe 52 are moved close to the billet 10. The X-axis moving stage 38 stops at a position that causes the first wave 70 and the second wave 72 emitted by the second probe 52 are focused at a portion (point P) slightly beyond the diameter center of the billet 10. Further, the Z-axis moving holder 42 is moved along the Z direction by the rotation of the ball screw 44. As a result, the probe holder 54 and the lower end of the billet 10 are placed face-to-face with each other (see FIG. 8A).

Next, the linear actuator is driven to displace the Y-axis moving slider 40 along the X-axis moving stage 38. As a result, the first probe 50 and the lower end portion of the billet 10 are placed face-to-face with each other. During this movement, or before or after the movement, the rotary table 28 is rotationally biased, and the billet 10 rotates integrally with the rotary table 28. In this state, the ultrasonic wave 56 is emitted from the first probe 50.

The ultrasonic wave 56 propagates through the water 24 stored in the storage tank 22, enters through the surface of the side peripheral wall of the billet 10, and advances from the surface into the billet 10 along the diameter direction. Since the first probe 50 is a point focusing probe, the ultrasonic wave 56 is focused inside the billet 10 at a predetermined depth from the surface, as shown in FIG. 8A. This focusing position can be adjusted by setting the propagation distance of the ultrasonic wave 56 in the water 24. In the present embodiment, the focusing position is set at a depth of substantially 50 mm from the surface. Then, as shown in FIG. 8B, in the case where there is a flaw 76 between the surface and the depth of 50 mm, the ultrasonic wave 56 is reflected by the inner wall of the flaw 76. A reflected wave 78 generated by this reflection is received by the transducer in the first probe 50.

As described above, the first probe 50 has a good S/N ratio, and even the reflected wave 78 from a FBH having a diameter of 0.17 mm can be distinguished from noise, as calculated based on Equation (2) described later. That is, even if the flaw 76 has such a very small size, an echo of sufficient peak height is produced. Therefore, the fine flaw 76 can be easily detected. When the flaw 76 is not present, no echo is generated. Thus, it is determined whether or not a flaw having a diameter of 0.17 mm or more exists in the billet 10, based on whether or not an echo is recognized.

While the ultrasonic wave 56 is emitted from the first probe 50, the integral rotation of the rotary table 28 and the billet 10 is continued. Further, the rotation of the ball screw 44 is continued, and the Z-axis moving holder 42 is gradually moved toward the upper end portion of the billet 10. Therefore, the trajectory of the position at which the ultrasonic wave 56 enters the billet 10 has a helical shape. In this way, the flaw inspection on the region from the surface to the depth of 50 mm of the billet 10 is performed by the first probe 50 from the lower end to the upper end over the entire circumference of the billet 10.

Next, a flaw inspection is performed in a range from the depth of 50 mm (actually about 35 to 40 mm) to beyond the diametric center of the billet 10. For performing such a flaw inspection, the Z-axis moving holder 42 moves downward and the Y-axis moving slider 40 is slightly displaced, so that the second probe 52 is placed face-to-face with the lower end of the billet 10, as shown in FIGS. 6, 7A and 7B. Thereafter, ultrasonic waves (the first wave 70 and the second wave 72) are emitted from the second probe 52.

Here, as shown in FIGS. 7A and 7B, the second wave 72 has a linear shape in a plan view as viewed in the Z direction. Further, in the side peripheral wall of the billet 10, a portion on which the second wave 72 is incident extends along the Z direction. In the incident portion, the curvature in plan view is negligibly small, and the incident portion is approximated by a linear shape. Therefore, the second wave 72 hardly receives a so-called lens effect due to the billet 10. Therefore, the second wave 72 is focused at a point (point P) beyond the diameter center of the billet 10. The distance (focal distance) of the second wave 72 from the second probe 52 to the point P at this time is defined as F2'. The speed of sound in the water 24 is about one-fourth the speed of sound in the heat-resistant nickel-based alloy, which is the material of the billet 10. Thus, F2' is about four times F2.

On the other hand, as shown in FIG. 6, in plan view as viewed in the Z direction, the first wave 70 has a substantially triangular shape in which the first wave 70 spreads at a position on the second probe 52 side and the beam diameter becomes smaller toward the billet 10. In the side peripheral wall of the billet 10, a portion on which the first wave 70 is incident extends along the circumferential direction of the billet 10. That incident portion is curved with a predetermined curvature. Thus, the first wave 70 undergoes a lens effect by the billet 10. In the first wave 70 at this time, the distance (focal distance) from the second probe 52 to the focused point (point P) is denoted by F1".

When the first wave 70 is not subjected to the lens effect, the distance (focal distance) F1" from the second probe 52 to the focused point of the first wave 70 is about one-fourth F1. On the other hand, when the first wave 70 receives the lens effect, the focal distance becomes longer. That is, F1'>F1". In this way, when the incident portion includes a curvature, the focal distance can be made longer than the original focal distance, due to the lens effect.

As described above, the first radius of curvature R1 and the second radius of curvature R2 (see FIG. 2) of the concave surface 68 of the second probe 52 are set such that the first wave 70 and the second wave 72 are focused at the point P which is substantially the same portion inside the billet 10. That is, F1'≈F2' (or F1'=F2') holds up. As described above, although ultrasonic waves emitted by the second probe 52 are focused at two positions in the water 24, the ultrasonic waves are focused at one position inside the billet 10 (see FIGS. 6, 7A and 7B). In short, the second probe 52, which is a double-focus probe, can be made to function as a point focusing probe.

In addition, the focal point of the first wave 70 and the focal point of the second wave 72 are positioned approximately beyond the diameter center of the billet 10, as described above. Therefore, the flaw inspection over a range from the depth of 50 mm to beyond the diametrical center inside the billet 10 can be performed only by the second probe 52. When a flaw is present within this range, a reflected wave is generated in the same manner as described above, and the reflected wave is received by the transducer 62 in the casing 60.

The second probe 52 also has a good S/N ratio, and accordingly even a reflected wave from the FBH having a diameter of 0.17 mm can be distinguished from noise. That is, even if the flaw has such a very small size, an echo having a sufficient peak height is generated in the actual inspection profile. On the other hand, when there is no flaw, no echo is generated. Thus, whether or not a flaw having a diameter larger than 0.17 mm exists deep inside the billet 10 can be determined based on the presence or absence of an echo.

As in the case of the flaw inspection by the first probe 50, the integral rotation of the rotary table 28 and the billet 10 is continued while the ultrasonic wave is emitted from the second probe 52. Further, the rotation of the ball screw 44 is continued, and the Z-axis moving holder 42 is gradually moved toward the upper end portion of the billet 10. As described above, since the trajectory of the incident position of the ultrasonic waves with respect to the billet 10 becomes helical, the flaw inspection on the region from the depth of 50 mm to the diameter inside the billet 10 is performed from the lower end to the upper end over the entire circumference of the billet 10.

As described above, according to the present embodiment, flaw inspection can be performed on the billet 10 having a diameter of 8 inches over a range from the surface to beyond the center of the diameter, by the two probes of the first probe 50 and the second probe 52. Therefore, it is possible to reduce the number of probes as much as possible. Therefore, the number of components of the flaw inspection apparatus 20 is reduced. Therefore, it is possible to reduce facility investment.

Further, in the flaw inspection, the number of scans by the probe (the number of movements of the probe in the Z direction) is the same as the number of probes. In this embodiment, the number of probes can be set to two, as described above. Therefore, the number of scans is two. Accordingly, the time required from the start to the end of scanning is shortened. That is, according to the present embodiment, the time required for the flaw inspection can be shortened.

In addition, the second probe 52 is obtained by manufacturing the front plate 64 having the concave surface 68. Therefore, the configuration of the second probe 52 is prevented from being complicated.

The billet 10 including a flaw is not used as a material for obtaining a member requiring excellent durability under a severe use environment, such as a constituent member of a turbine engine, and the like. In other words, according to the present embodiment, only the billet 10 in which the flaw existing thereinside is smaller than the detection limit of the flaw inspection apparatus 20 can be selected as a material for obtaining a member exhibiting excellent durability. Therefore, the production yield of the member exhibiting excellent durability is improved.

Moreover, it should be noted that the present invention is not limited to the disclosure described above, but various configurations may be adopted therein without departing from the essence and gist of the present invention.

For example, the diameter of the billet 10 may be other than 8 inches. In this case, the first radius of curvature R1 and the second radius of curvature R2 of the concave surface 68 of the front plate 64, the distance from the second probe 52 to the billet 10, and the like are set such that F1' and F2' substantially coincide with each other to such an extent that they exceed the diametrical center of the billet 10.

A solvent other than the water 24 may be used. Further, in addition to the first probe 50 and the second probe 52, one or more other probes may be used together.

EXAMPLES

Example 1

A second probe 52 having a front plate 64 in which the first radius of curvature R1 was 180 mm and the second radius of curvature R2 was 480 mm was produced, wherein a transducer 62 for emitting ultrasonic waves having a frequency of 10 MHz was housed in a casing 60 of the probe. The outer diameter of the casing 60 was set to 25 mm. The second probe 52 was immersed in water 24 in a posture in which the first imaginary contact line M1 was in the horizontal direction and the second imaginary contact line M2 was in the height direction, and then emitted ultrasonic waves. As a result, the focal distance F1 of the first wave 70 was 175 mm, and the focal distance F2 of the second wave 72 was 400 mm.

Next, a flat reference test piece made of a heat-resistant nickel-based alloy was immersed in the water 24. Then, ultrasonic waves were emitted from the second probe 52, which was spaced from the flat reference test piece by a distance of about 50 mm, toward the flat reference test piece, and entered the flat reference test piece in a direction substantially perpendicular to the surface of the flat reference test piece. Further, the focal distances of the first wave 70 and the second wave 72 were determined based on the obtained ultrasonic beam profile data. Then, the underwater converted distance (i.e., a converted distance in water) was calculated using the following Equation (1) in consideration of the fact that the sound velocity ratio of the flat reference test piece to the water is about 4.

$$\text{Underwater Converted Distance} = (\text{Distance from Probe to Object To Be Inspected}) + 4 \times (\text{Penetrating Depth of Ultrasonic Wave into Object To Be Inspected}) \quad (1)$$

For example, when the distance from the second probe 52 to the flat reference test piece is 50 mm and the penetrating depth from the surface of the flat reference test piece is 100 mm, the underwater converted distance is 450 mm.

According to the ultrasonic beam profile data, when the underwater converted distance was 160 mm, an echo shown in FIG. 5A was obtained based on the spread of the second wave 72. When the underwater converted distance was 350 mm, an echo shown in FIG. 5B was obtained based on the spread of the first wave 70. From this result, it can be seen that the second probe 52 is a double-focus probe. The focal distances of the second probe 52 are 160 mm and 350 mm in terms of underwater converted distance.

Next, a billet-shaped reference test piece having a diameter of 8 inches and in which a FBH having a diameter of 0.4 mm was formed as a reference flaw, was immersed in the water 24. Then, ultrasonic waves were emitted from the second probe 52 spaced from the reference test piece by about 50 mm, toward the billet-shaped reference test piece. The obtained ultrasonic beam profile data is shown in FIG. 9 together with the underwater converted distance calculated using Equation (1). It can be seen from FIG. 9 that as the underwater converted distance approaches 350 mm, the echo approaches a point shape and the area of the echo becomes smaller. From this, it is clear that the focal point of the first wave 70 and the focal point of the second wave 72 substantially coincide with each other inside the billet shape reference test piece. In addition, it is clear that the focal distance is 350 mm in terms of underwater converted distance.

Next, the sensitivity of the second probe 52 to the FBH was obtained based on the following Equation (2).

$$\text{Sensitivity in FBH \#} = \text{FBH \#}_{cal} \times \sqrt{(S_{npk})} \times \sqrt{(1.4125)} \times \sqrt{(1/80)} \quad (2)$$

where FBH $\#_{cal}$=Flat Bottom Hole Number used for Calibration; and $S_{npk}$=Peak Noise Amplitude Here, the Sensitivity in FBH # represents the diameter of the FBH that can secure S/N ratio of 3.0 dB. FBH $\#_{cal}$ is the number of the FBH that was used for calibration. FIG. 10 shows the relationship between the number of FBH $\#_{cal}$ and the diameter of the FBH. As described above, in this case, the FBH $\#_{cal}$ number is 1 since the diameter of the FBH inside the billet-shaped reference test piece is 0.4 mm.

Further, $S_{npk}$ is the maximum amplitude (maximum peak height) of noise. In this case, the maximum amplitude of the noise was less than 10% of the maximum amplitude of the FBH having a diameter of 0.4 mm. Therefore, when 1 is substituted for FBH $\#_{cal}$ and 10 is substituted for $S_{npk}$ in Equation (2), the value of the right side of Equation (2) is about 0.42. From this value, it can be seen that, in the actual inspection profile, the second probe 52 can indicate the FBH having a diameter of 0.42/64 inches, as an echo having an amplitude capable of securing the S/N ratio of 3.0 dB. When 0.42/64 inches is converted into millimeters, it is 0.17 mm.

From this result, it can be seen that the second probe 52 can detect very fine flaws corresponding to the FBH having a diameter of 0.17 mm over a range deep inside the billet 10 even if the billet 10 are relatively large, for example, the billet having a diameter of 8 inches. That is, by using the second probe 52, it is possible to determine whether or not there is a fine flaw over a range deep inside the billet 10.

Example 2

A second probe 52 having a front plate 64 and in which a transducer 62 for emitting ultrasonic waves having a frequency of 10 MHz or 15 MHz was housed in a casing 60 was produced. Various transducers 62 having different dimensions were used, and the first radius of curvature R1 and the second radius of curvature R2 were variously changed. With respect to such transducers, the characteristics as the double-focus probe were evaluated. When the frequency is 10 to 15 MHz and the size of the transducer 62 is 15 to 25 mm, it is preferable that the first radius of curvature R1 is 220 to 500 mm and the second radius of curvature R2 is 100 to 200 mm. The optimum results in this case are summarized in FIG. 11.

It can be seen from FIG. 11 that an excellent double-focus probe can be obtained by appropriately setting the first radius of curvature R1 and the second radius of curvature R2.

The invention claimed is:

1. An immersion probe comprising: a transducer configured to emit an ultrasonic wave having a frequency equal to or higher than 10 MHz, to an object to be inspected immersed in a solvent, the immersion probe being configured to inspect presence or absence of a flaw in the object to be inspected, by the ultrasonic wave, the immersion probe further comprising:
    a front plate having a circular shape in a plan view and in which a surface facing the object to be inspected is formed as a concave surface which is curved so as to be gradually depressed toward a center of the concave surface,
    wherein, when radii of curvature of a first imaginary contact line and a second imaginary contact line that extend so as to be curved along the concave surface are defined respectively as a first radius of curvature and a second radius of curvature, the first radius of curvature and the second radius of curvature are different from each other, the first imaginary contact line and the second imaginary contact line being orthogonal to each other at the center of the concave surface, and in the solvent where the object to be inspected is not present, the immersion probe has two focal points formed by the ultrasonic wave emitted from the transducer and having passed the concave surface focusing at two points, due to a difference between the first radius of curvature and the second radius of curvature.

2. The immersion probe according to claim 1, wherein the first radius of curvature and the second radius of curvature are set in a manner so that the ultrasonic wave that has passed through the solvent and entered the object to be inspected focuses at one point inside the object to be inspected.

3. The immersion probe according to claim 1, wherein a flat bottom hole having a diameter of 0.17 mm or more inside the object to be inspected is detectable.

4. A flaw inspection apparatus comprising: a storage tank that stores a solvent; and an immersion probe configured to emit an ultrasonic wave to an object to be inspected immersed in the solvent, wherein the immersion probe includes: a transducer configured to emit the ultrasonic wave having a frequency equal to or higher than 10 MHz, to the object to be inspected; and a front plate having a circular shape in a plan view and in which a surface facing the object to be inspected is formed as a concave surface which is curved so as to be gradually depressed toward a center of the concave surface, when radii of curvature of a first imaginary contact line and a second imaginary contact line that extend so as to be curved along the concave surface are defined respectively as a first radius of curvature and a second radius of curvature, the first radius of curvature and the second radius of curvature are different from each other, the first imaginary contact line and the second imaginary contact line being orthogonal to each other at the center of the concave surface, in the solvent where the object to be inspected is not present, the immersion probe has two focal points formed by the ultrasonic wave emitted from the transducer and having passed the concave surface focusing at two points, due to a difference between the first radius of curvature and the second radius of curvature, and in the solvent where the object to be inspected is immersed, the immersion probe has one focal point formed by the ultrasonic wave that has passed through the solvent and entered the object to be inspected focusing at one point inside the object to be inspected.

5. The flaw inspection apparatus according to claim 4, further comprising: a rotary table provided in the storage tank and configured to hold the object to be inspected; and a movable unit configured to move the immersion probe at least along a height direction of the object to be inspected held by the rotary table.

6. The flaw inspection apparatus according to claim 4, wherein the immersion probe comprises at least two immersion probes, and the ultrasonic waves emitted by the at least two immersion probes focus at different points inside the object to be inspected.

7. A flaw inspection method for inspecting presence or absence of a flaw in an object to be inspected, by an ultrasonic wave, wherein the ultrasonic wave having a frequency equal to or higher than 10 MHz is emitted from a transducer of an immersion probe, to the object to be inspected immersed in a solvent, the method comprising:

using, as the immersion probe, a probe including a front plate having a circular shape in a plan view and in which a surface facing the object to be inspected is formed as a concave surface which is curved so as to be gradually depressed toward a center of the concave surface, wherein when radii of curvature of a first imaginary contact line and a second imaginary contact line that extend so as to be curved along the concave surface are defined respectively as a first radius of curvature and a second radius of curvature, the first radius of curvature and the second radius of curvature are different from each other, the first imaginary contact line and the second imaginary contact line being orthogonal to each other at the center of the concave surface, wherein: in the solvent where the object to be inspected is not present, the immersion probe has two focal points formed by the ultrasonic wave emitted from the transducer and having passed the concave surface focusing at two points, due to a difference between the first radius of curvature and the second radius of curvature; and the first radius of curvature and the second radius of curvature are set in a manner so that in the solvent where the object to be inspected is immersed, the immersion probe has one focal point formed by the ultrasonic wave that has passed through the solvent and entered the object to be inspected focusing at one point inside the object to be inspected.

8. The flaw inspection method according to claim 7, wherein a cylindrical body having a diameter of 8 inches is used as the object to be inspected.

9. The flaw inspection method according to claim 7, wherein the object to be inspected is made of a nickel-based alloy.

10. The flaw inspection method according to claim 7, wherein at least two immersion probes are used as the immersion probe, and the ultrasonic waves emitted by the at least two immersion probes focus at different points inside the object to be inspected.

11. The flaw inspection method according to claim 7, wherein water is used as the solvent.

* * * * *